Patented July 14, 1931

1,814,287

UNITED STATES PATENT OFFICE

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PROCESS FOR CONTROLLING THE VULCANIZATION OF RUBBER AND SIMILAR MATERIALS AND PRODUCTS OBTAINED THEREBY

No Drawing. Original application filed June 25, 1923, Serial No. 647,757. Divided and this application filed November 1, 1927. Serial No. 230,386.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and causing vulcanization thereafter if desired; and to products obtained thereby.

The principal object of the present invention is to provide a process for checking the vulcanization of rubber which shall be simple and efficient, particularly in causing sure curbing or checking of vulcanization of rubber in any form including latex, cements or solid rubber whether applied to untreated rubber before vulcanization, to rubber containing one or more vulcanizing or other ingredients, or to rubber which has been partially or completely vulcanized while permitting easy resumption of vulcanization, at normal temperature 70° F. or above, say 212° F., or 240–286° F., later if desired. Another object of the invention is to provide a series of products resulting from such processes in which such control has been exercised and which therefore may be more readily manipulated in factory processes without danger of prevulcanization and which will result in rubber articles having improved physical charactertistics such as better resistance to ageing.

The invention accordingly comprises a process for controlling the vulcanization of rubber which includes causing a vulcanizing ingredient contained in rubber to react with a substance for checking the vulcanizing function of the ingredient and at will treating the rubber with an agent causing vulcanization, and the products obtained thereby.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780, filed July 13, 1922, continued in applications Nos. 41,875, filed July 6, 1925, 681,066, filed Dec. 17, 1923, and copending application No. 574,797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240–286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, cadmium, copper preferably in the cupric state, arsenic, preferably in the arsenous state, manganese, preferably in the manganous state and lead preferably in the plumbous state. It has been found in accordance with the present invention that the vulcanization accomplished by the presence of these ingredients may be controlled by controlling the vulcanizing function of any one of the ingredients by treating it, preferably in rubber, with a substance which reacts chemically therewith, preferably without removing the reaction product where solid rubber is employed although it may be removed later if desired, and that after such treatment to check the function, the vulcanization may be carried on in the presence of the other ingredients by the application of heat or by replacing the ingredient which was reacted upon by the same or another quantity of the same ingredient or another similar ingredient. The control of vulcanization in the manner constituting the present invention is particularly important in its action to prevent the premature vulcanization of rubber compounds containing accelerators and other vulcanizing ingredients which vulcanize at ordinary temperatures or slightly above. Taking the process of vulcanization set forth in Cadwell's copending application Sr. No. 441,691, filed Feb. 1, 1921, in which rubber, zinc oxide, sulphur and oxy normal butyl thiocarbonic acid disulphide are combined and the compound so formed subsequently exposed to the vapors of aniline, constituting the fourth, i. e. amine ingredient, to effect vulcanization, if this compound without exposure to aniline or other amine be allowed to stand for a period of time at ordinary temperatures vulcanization is apt to occur due it is believed to the action of the natural amine occurring in the rubber or to casual amine such as aniline picked up from the atmosphere of the factory, either of which may furnish the fourth ingredient required for vulcanization at ordinary temperature. The premature vulcanization occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved. In addition it has been found that the process may be applied to various types of raw rubber to produce a uniformity of vulcanization therein, for example various lots of smoked sheet vulcanize it has been found at varying speeds. By the application of the present process these varying speeds may be changed to a uniform speed. The uniformity of speed of vulcanization is important in that vulcanized articles having a uniform degree of vulcanization may be automatically secured.

For controlling the vulcanization by influencing the action of an amine or other basic nitrogenous matter constituting one of the four ingredients mentioned above, the amine may be rendered partially or totally inactive by treating it with nitroso bodies such as para nitrosodimethylaniline, nitroso beta naphthol, para nitrosodiethylaniline, or quinone, or similar materials and other bodies having similar properties. These substances lower the basicity of the amine or other basic nitrogenous matter present.

This application is a division of Serial No. 647,757, filed June 25, 1923, now U. S. Patent No. 1,698,715.

The substances for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is ready for vulcanization and partially or fully vulcanized rubber. The treatment with the various materials mentioned above may be accomplished in various ways, such as by mixing mechanically with the rubber either by milling or similar process or by stirring in latex or cement. Or the various substances either in the gaseous, liquid or solid state may be absorbed by latex, raw rubber, rubber sponge, cements or vulcanized or vulcanizing rubber.

The following procedures represents embodiments of my invention:

In one embodiment, 1.0 part of para nitrosodimethylaniline is combined with 100 parts of rubber, 2 parts of zinc oxide, 2 parts of sulphur and 2 parts of oxy normal butyl thiocarbonic acid disulphide by milling. This material may be stored or manipulated substantially without the occurrence of vulcanization therein. The paranitrosodimethylaniline reacts with natural or casual amine in the rubber. When it is desired to bring about vulcanization the compound is placed in a chamber and exposed to aniline vapor at a temperature of 140° F. for 14 hrs. at the end of which time vulcanization is accomplished.

Instead of the treatment with aniline vapors to accomplish vulcanization the compound may be immersed in a saturated aqueous solution of aniline for 12 hrs. and subsequently maintained at 212° F. in water or in air for 1 hr.

Instead of the treatment with aniline vapor to accomplish vulcanization a treatment with diethylamine vapor may be employed. In this case an amount of rubber is treated with an amount of diethylamine equivalent to 0.5% of the weight of the rubber.

Instead of treating the compound with aniline, diethylamine or the like thus replacing the ingredient whose vulcanizing function has been checked, heat alone may be employed. In carrying out the heat treatment the compound whose vulcanization has been checked by treatment with paranitrosodimethylaniline as above is placed in a chamber and maintained at a temperature of approximately 266° F. for 1 hr. at the end of which time vulcanization is accomplished. It will be observed that the quantity of paranitrosodimethylaniline may be varied as desired, and in general it has been observed that the larger the quantity of paranitrosodimethylaniline employed the more slowly vulcanization occurs at any temperature. If it is found for example that prevulcanization occurs in the milling of a compound containing any given amount of paranitrosodimethylaniline the addition of a further amount will avoid prevulcanization. Thereafter if aniline or other amine is combined with the compound vulcanization is caused with the usual rapidity as soon as the paranitrosodimethylaniline is neutralized.

It will be noted that various steps and processes set forth in my copending application Sr. No. 441,691, filed Feb. 1, 1921 may be used in conjunction with the present invention.

If desired, the nitroso compound may be introduced by diffusion. At ordinary temperatures, this material volatilizes sufficiently to be absorbed by the rubber. It may be introduced as follows: 100 parts of rubber which may contain casual amine or which may subsequently absorb a casual amine are mixed with 2 parts of zinc oxide, 2 parts of oxy normal butyl thiocarbonic acid disulphide and 2 parts of sulphur. This compound preferably in the form of masses of approximately 0.1 inch thickness or less is maintained over night in a receptacle containing the nitroso compound whose vapors at ordinary temperature are distributed about the receptacle and penetrate the rubber mass, reacting with any casual amine already present. Thereafter the rubber so compounded is removed and a quantity of nitroso compound remains therein so that any casual amine that may come in contact with the rubber will be neutralized by the paranitrosodimethylaniline present. The vulcanization of the compound is accordingly retarded. Vulcanization may be resumed by placing the compound in a receptacle containing aniline vapor heated to 140° F. for 14 hrs. whereupon vulcanization is completed. Any of the procedures given under the first example may be used. The amount of nitroso compound should be adjusted so that the rubber will absorb sufficient to react with the amine, with an excess remaining at the end of the period of exposure.

Instead of oxy normal butyl thiocarbonic acid disulphide mentioned in any of the above examples, the following vulcanizing ingredients may be substituted to be treated by the processes before mentioned herein: Zinc butyl xanthogenate, thiobenzoylmonosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of the zinc butyl xanthogenate, thiobenzoylmonosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,962, 1,440,963, 1,440,964, 1,440,961, and my copending applications Sr. Nos. 548,828, 548,829, 548,831, now issued as U. S. Patents 1,532,226, 1,532,227 and 1,510,652, respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon disulphide or materials containing the group

where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. They permit easy resumption of vulcanization later, if desired. Furthermore a uniform rate of vulcanization may be established for different lots of raw rubbers such as smoked sheet by the processes described. The products resulting from the process may be manipulated without fear of premature vulcanization and as a result the difficulty of producing scrap rubber in factory operations which vulcanized before it could be reformed into articles and which represented accordingly a loss has been done away with. Products in which over-vulcanization has been prevented by the processes herein included have a correspondingly increased resistance to ageing.

Having thus described my invention, what I claim and desire to protect by Letters Patent is:

1. A process for controlling the vulcanization of rubber containing sulphur, amine, metal in combination, and a material containing the group

where X is sulphur or an equivalent element or group which comprises causing the amine contained in rubber to react with a nitroso compound to check the usual vulcanizing action on the rubber of the amine, treating the rubber with a quantity of amine, and vulcanizing the rubber.

2. A process for controlling the vulcanization of rubber containing sulphur, amine, metal in combination, and a material containing the group

where X is sulphur or an equivalent element or group which comprises causing the amine contained in rubber to react with para nitrosodimethylaniline to check the usual vulcanizing action on the rubber of the amine, treating the rubber with a quantity of amine, and vulcanizing the rubber.

3. A step in the process of controlling the vulcanization of rubber containing sulphur, amine, metal in combination, and a material containing the group

where X is sulphur or an equivalent element or group which comprises reacting on the amine contained in rubber with a nitroso body for checking the vulcanizing function of the amine.

4. A step in the process of controlling the vulcanization of rubber containing sulphur, amine, metal in combination, and a material containing the group

where X is sulphur or an equivalent element or group which comprises reacting on the amine contained in rubber with para nitrosodimethylaniline for checking the vulcanizing function of the amine.

5. A process for checking the vulcanizing action of the amine in a compound containing rubber, a metal in combination, an amine, and a material comprising the group

where X is sulphur or an equivalent element or group, by introducing into the compound a nitroso body.

6. A process of controlling the vulcanization of rubber which comprises checking the vulcanizatin of rubber containing a low temperature vulcanizing combination of sulphur, an accelerator derived from carbon disulphide, zinc in combination, and a basic nitrogenous body, by treatment with a nitroso body and then at will treating the rubber with an "agent" causing vulcanization.

7. A process for checking the vulcanizing action of the amine in a compound containing rubber, a metal in combination, an amine, and a material comprising the group

where X is sulphur or an equivalent element or group, by introducing into the compound a nitroso body and then at will treating the rubber with an "agent" causing vulcanization.

8. A vulcanized rubber product derived from rubber containing a vulcanizing combination of sulphur, an accelerator derived from carbon disulphide, zinc in combination and a basic nitrogenous body and which rubber stock has been treated with a nitroso body prior to complete vulcanization.

9. A vulcanized rubber product derived from rubber containing a vulcanizing combination of sulphur, an accelerator derived from carbon disulphide, zinc in combination and a basic nitrogenous body and which rubber stock has been treated with a nitroso body prior to complete vulcanization below 240° F.

Signed at New York, county and State of New York, this 26th day of October, 1927.

SIDNEY M. CADWELL.